(12) United States Patent
Panicacci et al.

(10) Patent No.: US 6,473,124 B1
(45) Date of Patent: Oct. 29, 2002

(54) RAM LINE STORAGE FOR FIXED PATTERN NOISE CORRECTION

(75) Inventors: Roger Panicacci; Barmak Mansoorian, both of Los Angeles; Eric Fossum, La Crescenta, all of CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/066,506

(22) Filed: Apr. 23, 1998

(51) Int. Cl.$^7$ .............................................. H04N 5/217
(52) U.S. Cl. ...................................... 348/241; 348/243
(58) Field of Search .................................. 348/241, 243, 348/248, 249, 250, 311; H04N 5/217

(56) References Cited

U.S. PATENT DOCUMENTS

| | | | |
|---|---|---|---|
| 4,317,134 A | * | 2/1982 | Woo et al. |
| 5,754,224 A | * | 5/1998 | Kusaka ........................ 348/207 |
| 6,067,113 A | * | 5/2000 | Hurwitz et al. ............. 348/241 |

* cited by examiner

*Primary Examiner*—Tuan Ho
(74) *Attorney, Agent, or Firm*—Fish & Richardson P.C.

(57) ABSTRACT

A random access memory stores values indicative of fixed pattern noise from a pixel circuit, which are used to compensate the pixel output to compensate for the fixed pattern noise.

13 Claims, 1 Drawing Sheet

RAM LINE STORAGE FOR FIXED PATTERN NOISE CORRECTION

BACKGROUND OF THE INVENTION

The present invention describes a line storage system for fixed pattern noise correction in an active pixel sensor.

Active pixel sensors are known and are typically made as described in U.S. Pat. No. 5,471,515, the disclosure of which is herewith incorporated by reference to the extent necessary for proper understanding. Such active pixel sensors include associated circuitry within each "pixel" for amplifying and processing the signal. This associated circuitry can cause certain losses and gains in the signal. The losses and gains of each circuit introduce a pattern. That pattern, which is representative of the associated circuitry, is called fixed pattern noise.

When column-parallel A/D conversion of the pixel values is used, noise is introduced by the response of each A/D converter due to device variations across a chip. Each A/D converter produces a different value because of these device variations. This compares with an ideal system where all A/D converters would produce the same result for all input signals.

SUMMARY OF THE INVENTION

According to the present invention, information indicative of a fixed pattern noise is obtained and stored. This information indicative of fixed pattern noise is then subtracted from subsequent operations to reduce the non-uniformity.

BRIEF DESCRIPTION OF THE DRAWING

These and other aspects of the invention will now be described with reference to the attached drawings, in which.

DESCRIPTION OF THE PREFERRED EMBODIMENTS

Figure 1:
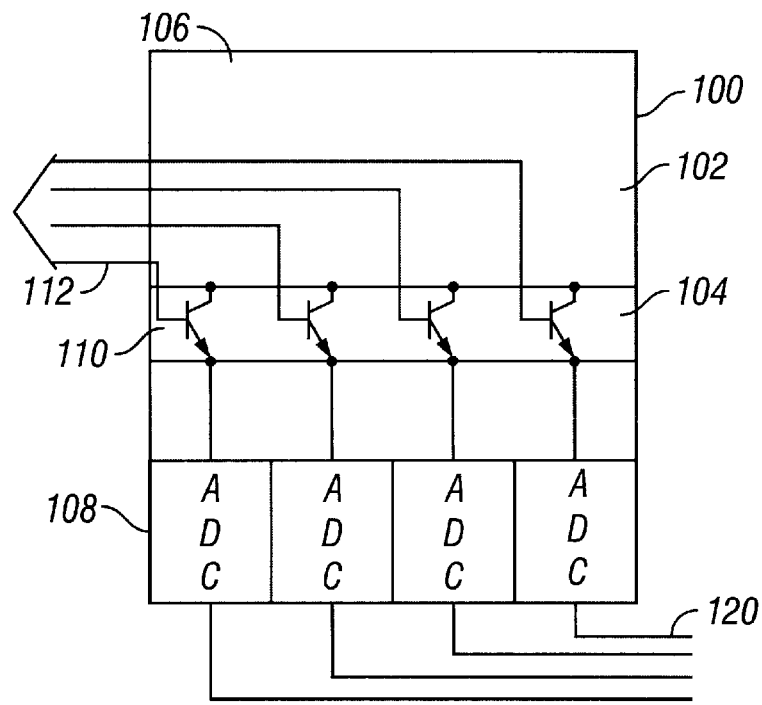
FIG. 1 shows a column parallel active pixel sensor.
Figure 2:
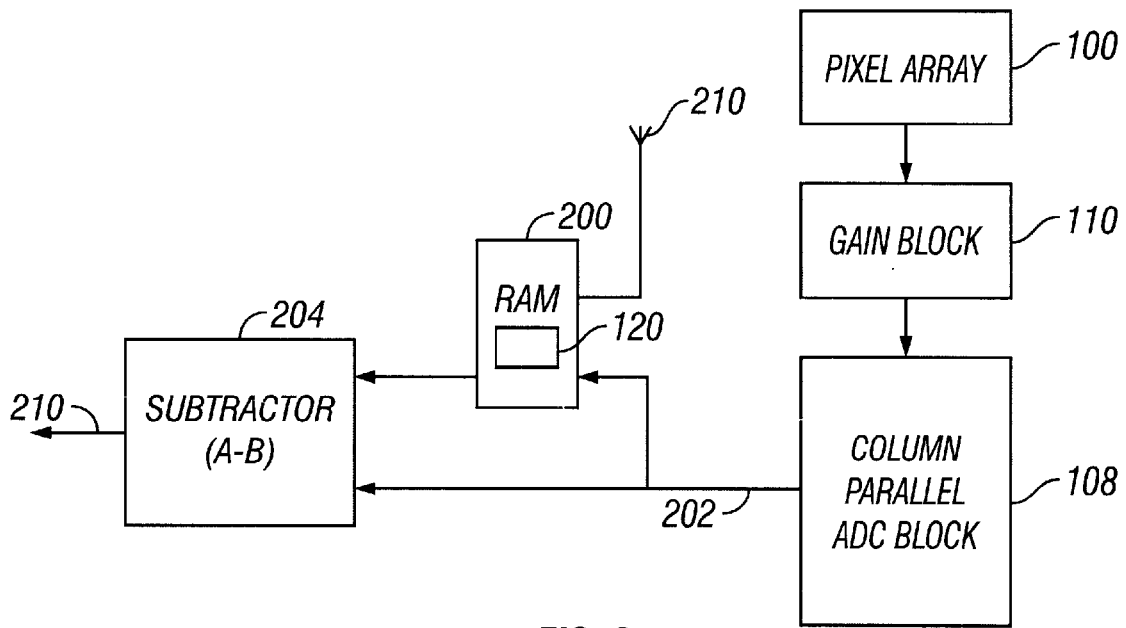
FIG. 2 shows a block diagram of the fixed pattern noise correction circuit.

An embodiment is shown in FIGS. 1 and 2. FIG. 1 shows a column parallel A/D converter block with four bits. The column parallel block 100 includes a plurality of light accumulating elements in units of pixels, in pixel area 102. One particular row of pixels 104 is selected at each time. This means that each of the columns of pixels, e.g., column 106, is evaluated at any one time by an associated A/D converter 108 to produce multiple digital outputs indicating the values of the column. This technique is called column parallel, since each column is evaluated in parallel with each other column, effectively producing a row of pixel information at each one time.

As an initial step in the operation, the system in FIG. 1 is evaluated using a fixed pattern noise determination circuit, e.g., a circuit that evaluates the output of the circuit when the input represents zero values. The output signal 120 then represents the amount of fixed pattern noise for a zero signal. Alternatively, non-zero signals could be used with appropriate modification. The fixed pattern noise signal 120 is then used in combination with the correcting circuit of FIG. 2.

The A/D block 108 is associated with a storage element, e.g. RAM 200, which stores therein the value 120 which is obtained during the initial operation. Either a single reference line can be stored in the memory, or the entire array can be appropriately modified by storing an entire array in the memory. The reference line may be generated from a light-shielded row in the pixel array in order to only obtain information from the A/D converters. Alternately, an external reference source, or a non-light shielded row in the pixel array that receives a double reset to effectively make it dark can generate the information. The storage line contains various numbers based on the fixed offsets of each column circuit. The dark lines stored in the RAM 200 is then subtracted from each output line 202 using a fixed pattern noise compensation circuit, e.g., an arithmetic unit shown as subtractor 204. The output 210 of subtractor 204 therefore offset compensates the pixels, and hence represents the fixed pattern noise-modified and corrected system.

The circuit of FIG. 2 also includes an external input shown as 210 which allows entry of an offset or pedestal, if desired, for the A/D converter. This offset is also added to the eventual signal by subtractor 204.

The RAM 200 can be of any desired type as long as it can be used for subtracting fixed pattern noise. The RAM can be SRAM formed in CMOS, DRAM, ROM, EPROM, EAROM, EEPROM, fused memory (field programmable memory), SDRAM, or SGRAM.

Although only a few embodiments have been described in detail above, those of ordinary skill in the art will certainly understand that many modifications are possible in this embodiment. For example, the above embodiment has described compensation for fixed pattern noise one line at a time. Alternatively, the entire pixel array could be so compensated.

In that case, the RAM 200 stores an entire array of fixed pattern noise compensation information, and is addressed row by row to read out the information for compensation.

All such embodiments are intended to be encompassed within the following claims, in which:

What is claimed is:

1. A fixed pattern noise correcting circuit, comprising:
   a fixed pattern noise determination element which operates to determine fixed pattern noise for a plurality of substantly simultaneously-obtained digitized pixel values, said fixed pattern noise representing some offset in a plurality of analog-to-digital converters used to obtain said values;
   a storage element, storing a value indicative of said fixed pattern noise; and
   a fixed pattern noise compensation circuit, operating to remove fixed pattern noise from said pixel values using said value indicative of said fixed pattern noise.

2. A circuit as in claim 1, further comprising an active pixel sensor device, including a plurality of light accumulating elements to produce said pixel values, and associated circuitry which operates to process said pixel values.

3. A circuit as in claim 1, wherein said fixed pattern is noise compensation circuit, includes a arithmetic element, operating to subtract said value indicative of fixed pattern noise from said pixel values.

4. A circuit as in claim 1, further comprising an offset input, which allows changing said pixel values by an amount of said offset.

5. A circuit as in claim 4, further comprising an offset input, which allows supplying an offset to said arithmetic element, to change said pixel values by an amount of said offset.

6. A circuit as in claim 1, wherein said memory stores a line of fixed pattern noise information.

7. A fixed pattern noise reducing image sensing apparatus, comprising:

an array of image obtaining elements obtaining values indicating an image;

a plurality of image processing circuit elements, respectively processing said values, said elements including a plurality of analog-to-digital converters;

a memory, storing information indicating fixed pattern noise in said value indicating the image, said fixed pattern noise being at least in part due to variations in response of at two of said analog-to-digital converters; and an arithmetic device, operating to change said values by a value stored in said memory, to thereby compensate for said fixed pattern noise.

8. An image sensing device, comprising:

a plurality of image sensing elements producing an output indicating elements of an image;

a plurality of analog-to-digital converters operative to digitize said output;

a circuit which adds different offsets to different ones of said output indicating image sensing elements;

an offset detecting element, detecting said offsets due to device variations in said plurality of analog-to-digital converters for a plurality of said image sensing elements; and an offset compensator, operating to change said output indicating said image sensing elements in a way that tends to reduce said offsets.

9. A device as in claim 8, wherein said offset compensator is an arithmetic device that adds or subtracts a value indicating said offset.

10. A device as in claim 9, further comprising a memory element storing a value indicative of said offsets detected by said offset detecting element.

11. A device as in claim 8, wherein said offset detecting element is a light-shielded row of said image sensing elements.

12. A device as in claim 8, wherein said offset detecting element is a normal row of said image sensing elements which is reset to provide a substantially zero output.

13. A method of acquiring an image, comprising:

determining fixed pattern noise for a plurality of substantially simultaneously-obtained pixel values, said fixed pattern noise representing some offset in a plurality of analog-to-digital converters used to obtain said values;

storing a value indicating said fixed pattern noise; and adding the value indicating said fixed pattern noise to the pixel values to compensate he pixel value for the fixed pattern nose.

* * * * *

UNITED STATES PATENT AND TRADEMARK OFFICE
CERTIFICATE OF CORRECTION

PATENT NO. : 6,473,124 B1
DATED : October 29, 2002
INVENTOR(S) : Roger Panicacci et al It is certified that error appears in the above-identified patent and that said Letters Patent is hereby corrected as shown below:

Column 2,
Line 42, "substantly" should read -- substantially --

Column 3,
Line 12, "at two" should read -- at least two --.

Column 4,
Line 24, "he" should read -- the --.

Signed and Sealed this

Fifth Day of August, 2003

JAMES E. ROGAN
*Director of the United States Patent and Trademark Office*